Sept. 7, 1948.   G. T. SMITH-CLARKE ET AL   2,448,742
BUILT-UP CRANKSHAFT
Filed March 20, 1945

Inventors
George T. Smith-Clarke
and Arthur F. Varney
by Mawhinney & Mawhinney
Attorneys Patented Sept. 7, 1948

2,448,742

UNITED STATES PATENT OFFICE 2,448,742

BUILT-UP CRANKSHAFT

George T. Smith-Clarke and Arthur Francis Varney, Coventry, England, assignors to Alvis Limited, Coventry, England Application March 20, 1945, Serial No. 583,752
In Great Britain January 13, 1945

5 Claims. (Cl. 74—598)

1

This invention relates to a built-up crankshaft for an internal-combustion engine.

Our main object is to provide an improved crankshaft of this character with which the journalling of the big end of a connecting rod will be effected in a simple and very satisfactory manner, and which will allow of the replacement of the bearing with very little difficulty when this should be necessary.

U. S. patent specification No. 2,151,624 discloses a built-up crankshaft having coaxial hollow portions of a crankpin which are secured together end-to-end and have a keying connection with a separate, rigid internal member.

According to the present invention, coaxial hollow portions of a crankpin are secured against an internal flange of a sleeve encircling the portions and having an external bearing surface, the flange and the said portions having keying connections with one another through a rigid means in the interior thereof. The said rigid means may be integral with one of the said portions; but in order to facilitate production it is preferably separate therefrom, being, in that case, keyed to both.

According to a further feature of the invention, a built-up crankshaft has two coaxial, hollow crankpin portions which are preferably of equal lengths and which are secured by means of a through bolt against an internal flange of an alloy steel sleeve having an external surface of bearing material and fitted round the said portions, preferably as a push fit thereon, the said portions and the flange having splined connections with a separate, fitted sleeve having clearance round the bolt.

Figure 2:
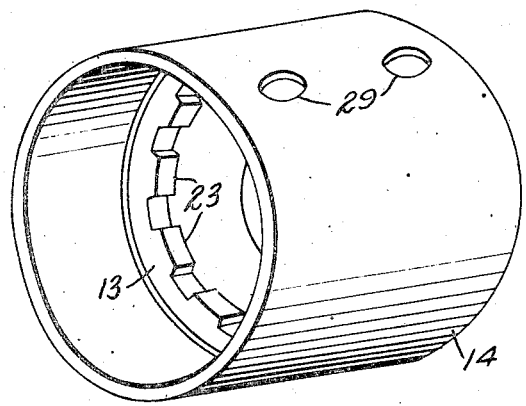
Figure 2 is a perspective view of the bearing sleeve.
Figure 3:
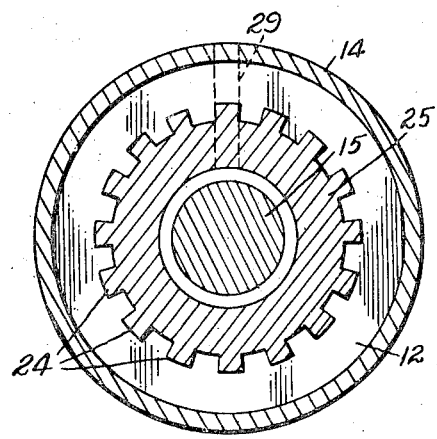
Figure 3 is a cross section, to a smaller scale, taken on the line 3—3 of Figure 1 but omitting the connecting rod.

The drawing shows a built-up crankshaft with two coaxial portions 10, 10. They can be supported in main bearings, not shown, in any convenient manner, and they are formed integrally with crankarms 11, 11 carrying coaxial, hollow crankpin portions 12, 12. These portions 12 are bolted against an interposed flange 13 of a sleeve 14 by means of a through bolt 15 which is here shown as screwing directly into one of the portions and abutting the other through a washer

2

16. When the parts have been secured together, the bolt is finally located by means of a cap 17 having a non-circular internal periphery corresponding to that of the bolt head, the cap being in turn located by means of a grub screw 18 retained in position by a locking washer 19.

Figure 1:
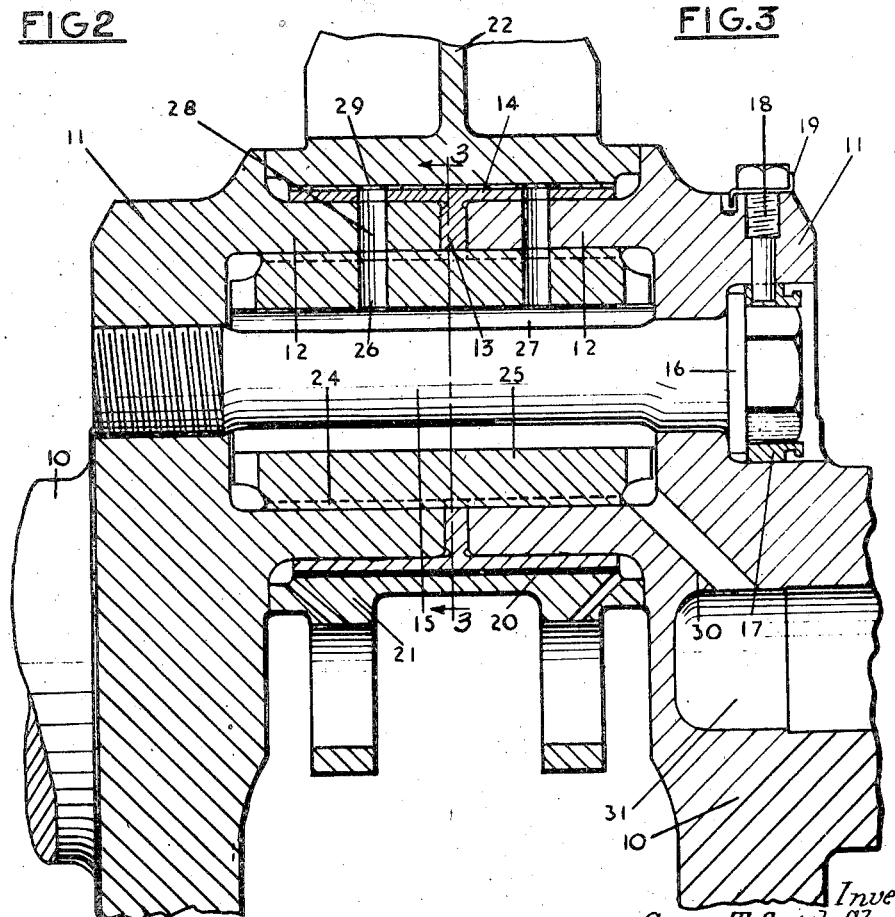
Figure 1 is a fragmentary sectional elevation of a built-up crankshaft according to the invention.

The sleeve 14 has its external periphery coated with white metal or any other bearing material, indicated at 20 in Figure 1, serving as the bearing for the big end 21 of the master connecting rod 22. It is preferably a push fit on the crankpin portions 12, 12, and it is located against angular movement by means of teeth 23 on its flange 13 engaged with splines 24 on a rigid sleeve 25 having a splined connection with corresponding splines provided internally of the crankpin portions 12, 12 within which the sleeve 25 is fitted. It may be a drive fit in one of the portions and a sliding fit in the other.

The sleeve 25, it will be observed, has clearance from the bolt 15, and it is provided with radial passages 26 along which lubricant can be transmitted from the annular space 27 round the through bolt, through the radial passages 28, 29 in the crankpin portions and in the sleeve 14, respectively, to lubricate the big-end bearing. 30 represents a passage along which lubricant can be delivered from the hollow interior 31 of one of the crankshaft portions 10 through appropriate passages in the rigid sleeve 25 to the annular space 27.

The bearing sleeve 14 is positively held against rotation in this way, and this reduces the likelihood of its distorting in conditions of high loading, with the result that the bearing is capable of carrying high loads for a relatively long period without seizure or other difficulties arising. In other words, the bearing has an unusually long life. When, however, it is desired that the bearing should be inspected or replaced, it can be taken down and removed in a very simple manner.

The method by which the bearing material is formed or applied to the surface of the sleeve 14, or by which the sleeve itself is formed of bearing material, forms no part of the invention, as this is well known per se.

What we claim as our invention and desire to secure by Letters Patent of the United States is:

1. A built-up crankshaft, for an internal-combustion engine, comprising coaxial hollow portions of a crankpin, a sleeve having an internal flange, said sleeve mounted on said portions with its flange extending between said portions, said sleeve having an external bearing surface.

and a rigid means providing keying connections for said flange and said portions in the interior of said flange and portions.

2. A built-up crankshaft for an internal-combustion engine, comprising two coaxial, hollow, crankpin portions, an alloy steel sleeve having an internal flange, a through bolt securing said portions against said flange, said sleeve having an external surface of bearing material and being fitted round said portions, and a separate, fitted sleeve having clearance round said bolt and having splined connections with said portions and said flange.

3. A built-up crankshaft having two crank arms, coaxial hollow crankpin portions carried thereby, a sleeve on said crankpin portions, said sleeve having an internal flange extending between the ends of said portions, said sleeve having an external surface of bearing material, a through bolt securing said portions against said flange, a rigid means within said portions and disposed round said bolt with clearance, a splined connection between said rigid means, on the one hand, and each said portion on the other hand, and a splined connection between said flange and said rigid means.

4. A built-up crankshaft having two crank arms, coaxial tubular crankpin portions integral therewith, said portions being of the same dimensions, an alloy steel sleeve fitted round said portions, said sleeve having an external surface of bearing material and having internally a flange extending between the adjacent ends of said portions, internal splines formed in said portions and in said flange, a metal sleeve with external splines fitted into said portions and said flange, and a bolt screwed into one of said crank arms and having its head in a recess in the other of said crank arms and serving for securing said portions against said flange, said bolt having clearance from said second-mentioned sleeve, and said portions and second-mentioned sleeve being drilled to provide a plurality of bores leading to the clearance round said bolt.

5. A crankshaft part comprising arms having separable tubular pin portions, a separable bearing sleeve on said pin portions, said sleeve having an internal flange extending between the ends of said pin portions, means for preventing relative rotation of said sleeve and pin portions, and means to hold said pin portions together against said flange.

GEORGE T. SMITH-CLARKE.
ARTHUR FRANCIS VARNEY.

REFERENCES CITED

The following references are of record in the file of this patent:

UNITED STATES PATENTS

| Number | Name | Date |
|---|---|---|
| 1,283,803 | Kirkham | Nov. 5, 1918 |
| 2,151,624 | Smith-Clarke | Mar. 21, 1939 |
| 2,324,373 | Dusevoir | July 13, 1943 |